United States Patent [19]
Andre De La Porte et al.

[11] Patent Number: 5,534,318
[45] Date of Patent: Jul. 9, 1996

[54] HOLLOW FIBER-REINFORCED PLASTIC BODY

[75] Inventors: Gilles Andre De La Porte, Rozendaal; Cornelis T. J. M. Swinkels, Helmond, both of Netherlands

[73] Assignee: Parabeam Industrie-en Handelsonderneming B.V., Netherlands

[21] Appl. No.: 203,598

[22] Filed: Feb. 28, 1994

Related U.S. Application Data

[63] Continuation of Ser. No. 853,180, Mar. 17, 1992, abandoned.

[30] Foreign Application Priority Data

| Mar. 18, 1991 | [DE] | Germany | 9103282 U |
| Jun. 13, 1991 | [DE] | Germany | 9107320 U |
| Dec. 14, 1991 | [DE] | Germany | 9115518 U |

[51] Int. Cl.$^6$ .................................................. B29D 24/00
[52] U.S. Cl. ................ 428/36.9; 428/36.91; 428/36.92; 428/93; 428/116; 428/118; 220/562; 220/581; 220/586; 220/591; 220/445; 220/466; 220/DIG. 23; 220/ DIG. 24
[58] Field of Search ..................................... 138/104, 129, 138/132, 144, 150; 428/35.7, 36.1, 36.2, 36.9, 36.91, 93, 116, 117, 188, 229, 236, 238, 247, 251, 252, 257, 259, 902; 220/562, 581, 586, 588, 591, 445, 466, DIG. 23, DIG. 24

[56] References Cited

U.S. PATENT DOCUMENTS

| Re. 25,429 | 7/1963 | Sheel | 428/176 |
| 2,903,016 | 9/1959 | Cobi | 138/129 |
| 3,045,319 | 7/1962 | Scheel | 428/176 |
| 4,840,828 | 6/1989 | Bottger et al. | 428/120 |
| 4,971,642 | 11/1990 | Schwan | 156/85 |
| 5,164,241 | 11/1992 | Andre de la Porte | 428/97 |
| 5,172,730 | 12/1992 | Driver | 138/104 |
| 5,175,034 | 12/1992 | Andre de la Porte | 428/36.1 |

FOREIGN PATENT DOCUMENTS 1462699  1/1977  Switzerland.

OTHER PUBLICATIONS

European Search Report, Jan. 29, 1992.

*Primary Examiner*—James J. Seidleck
*Assistant Examiner*—Michael A. Williamson
*Attorney, Agent, or Firm*—Cushman Darby & Cushman

[57] ABSTRACT

The invention relates to a hollow fiber-reinforced plastic body comprising a curable resin-impregnated winding of high-strength fibers. To provide a strong hollow fiber-reinforced plastic body having a quick-to-make wall thickness the invention proposes that a double-walled shell which surrounds the hollow body interior is made by a first winding of one or more tapes of an uncut double pile cloth having a spaced-apart top cloth and bottom cloth and also binding pile threads which is covered by an outer winding, the windings being impregnated with a curable resin.

17 Claims, 2 Drawing Sheets

HOLLOW FIBER-REINFORCED PLASTIC BODY

This is a continuation of application Ser. No. 07/853,180, filed on Mar. 17, 1992, which was abandoned upon the filing hereof.

BACKGROUND OF THE INVENTION

1. The Field of the Invention

The invention relates to a hollow fiber-reinforced plastic body comprising a resin-impregnated winding of high-strength fibers to build up the plastic body wall.

2. Description of the Related Art

Hollow fiber-reinforced plastic bodies have been produced by winding resin-impregnated rovings or combinations of various glass filament materials on a rotating drum or core, the resins used being preferably thermosetting polyester and epoxy resins. The winding can take place in various patterns of selectable pitch angles and numbers of layers, to wall thicknesses which preferably range from 1 to 4 cm. Owing to their high strength, these hollow plastic bodies can be used as pressure pipes, tank containers, towers and the like. However, it takes a long time to build up to the wall thickness and there is a risk of seepage.

It is therefore also known to wind hollow fiber-reinforced plastic bodies in two cover layers of resin-impregnated rovings between which a core layer of a plastics foam is placed by manual lay-up. The plastics foam is a quick way of achieving the desired wall thickness. However, the plastics foam is not resistant to ageing, since it decomposes in time. The use of such hollow plastic bodies for pipes or tanks for transporting and storing chemicals or oil therefore represents a danger to the environment.

SUMMARY OF THE INVENTION

Figure 1:
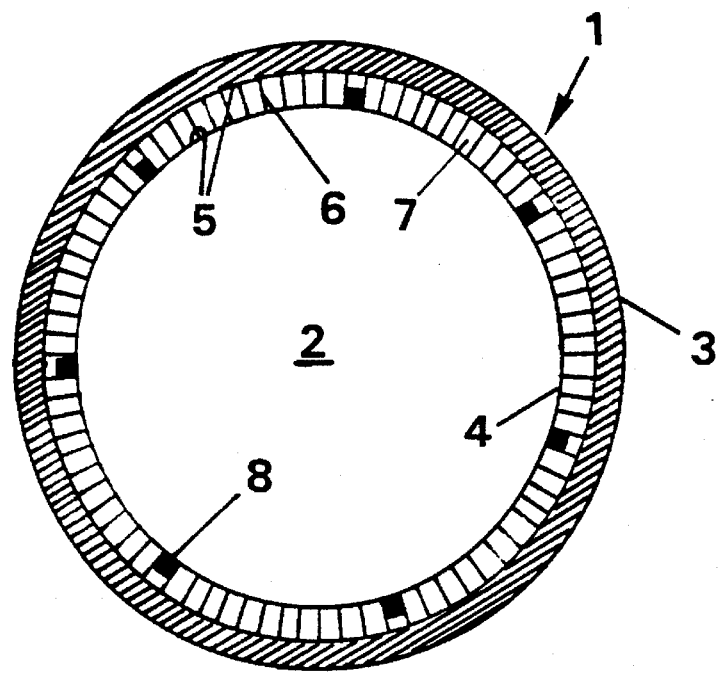
FIG. 1 is a schematic cross-section of a first embodiment of a hollow fiber-reinforced plastic body.

It is therefore an object of the present invention to provide a hollow fiber-reinforced plastic body which is strong, quick to make in the required wall thickness, and safe as regards the risk of seepage.

This object is achieved when a winding of one or more tapes or strips of an uncut double pile cloth having a spaced-apart top cloth and bottom cloth and also binding pile threads is provided as a double-wall shell which surrounds the hollow body interior and builds up the wall together with a cover winding.

The invention provides a hollow fiber-reinforced plastic body which, through the inlaying of a double-walled shell in the form of an uncut double pile cloth surrounding the hollow body interior, possesses a safety wall. As the resin hardens, the pile threads between the upper and lower part of the double pile cloth stiffen and leave a cavity in which leak detectors or other leak indicating devices can be fitted.

The top and bottom cloths also form two successive stiffened walls which shield the hollow body interior off against the outside. In the event that fluid should seep through the inner wall, it is trapped in the cavity and prevented by the second wall from further seeping towards the outside. The double-walled shell thus not only permits early detection of a leak but also prevents egress of the leaked material, at least for a certain length of time.

The double-walled shell comprising an uncut double pile cloth can be constructed, in particular in the case of cylindrical bodies, by winding one or more fabric tapes or strips, preferably with the edges of the tapes open towards the side. This wound layer thus permits the construction of an unbroken safety cavity which extends around the hollow body interior.

The warp and weft threads making up the top and bottom cloths and also the pile threads can be made of high-strength fibers, for example glass. The fibers used can either be spun as staple fibers into yarns or take the form of monofilaments or multifilaments.

The pile threads can be laid into a double pile cloth woven by the warp pile fabric velvet technique in a V- or W-binding. The length of the pile threads as spacers between the top and the bottom cloths can be 3 to 8 mm. The density can be 20 to 80 pile threads/cm$^2$, depending on the cubic capacity of the safety cavity.

A hollow fiber-reinforced plastic body of high stiffness is obtained by arranging the double pile cloth as a core layer between two resin-impregnated wound layers of high-strength fibers. To smooth the wound layer of high-strength fibers relative to the core layer it is possible to place glass mats in between.

As resin for impregnating high-strength fibers, in particular rovings, it is possible to use a curable reactive resin, for example unsaturated polyester, epoxies, vinyl esters, phenolic, PUR, silicone (SI), polyimide (PI), polyamide-imide (PAI) resins or UV-curing resins.

According to a further embodiment of the invention the double-walled shell made of an uncut pile cloth can be used as a passage for the flow of a temperature control material such as water or oil. Advantages are good heat transfer or dissipation of heat. The flow rate depends easily on the flow speed and distance between top and bottom cloth.

Other objects, features and advantages of the invention will become more fully apparent upon consideration of the claims and the following description.

DETAILED DESCRIPTION OF THE INVENTION

FIG. 1 is a schematic view of a first embodiment of a hollow fiber reinforced plastic body 1 having a cylindrical or spherical wall which encloses an interior 2. The interior 2 is used for storing and/or transporting fluid, in particular chemicals.

The wall of the hollow plastic body 1 comprises a cover winding 3 of high-strength fibers and a first winding 4 of one or more tapes of an uncut double pile cloth. The two windings 3, 4 have been wound on top of one another and densified by resin curing. The winding 3 of the high-strength fibers has been wound on top of the winding 4 of the double pile cloth according to a selectable pattern of selectable pitch angles and numbers of layers. The high-strength fibers used can be rovings or combinations of other glass filament products.

The winding 4 of uncut double pile fabric forms a double-walled shell which lines the interior 2 of the hollow plastic body 1. The uncut double pile cloth includes top and bottom cloths 5, which are arranged spaced-apart from each other and are joined together by in-laid pile threads 6 which cross the between cloth space. The top and bottom cloths 5 thus form two spaced-apart walls which enclose a safety or detector cavity whose cubic capacity is only partly taken up by the pile threads 6, leaving a safety cavity. This safety cavity is subdivided, by rows of adjacent pile threads 6, into a multiplicity of individual safety cavity compartments 7. The resin impregnation of the double pile cloth and hence the hardening of the double pile cloth brings about a densification of the top and bottom cloth 5 and a stiffening of the pile threads 6 without filling up the safety cavity compartments 7. Within the safety cavity compartments 7 there are preferably arranged leakage detectors 8, which can be arranged disposed over the circumferential surface of the interior 2. Other leakage indicating devices can be used as well.

The top and bottom cloths 5 consist of crossing warp and weft threads in a standard weave or derived weave. The double pile cloth has preferably been woven by the warp velvet technique, so that the pile threads 6 extend in the warp direction, specifically in a V- or W-binding. The length of the pile threads, which as spacers determine the distance between the top and bottom cloths, is between 3 and 8 mm. The density is between 20 and 80 pile threads/$cm^2$. The fiber material used for the top and bottom cloths 5 and the pile threads 6 are high-strength fibers, for example glass fibers, carbon fibers and aramid fibers. The fibers used can either be spun as staple fibers into yarns or take the form of monofilaments or multifilaments. If glass fibers are used, the weft may also include some fibers of a thermoplastic material, preferably up to 25%.

Figure 4:
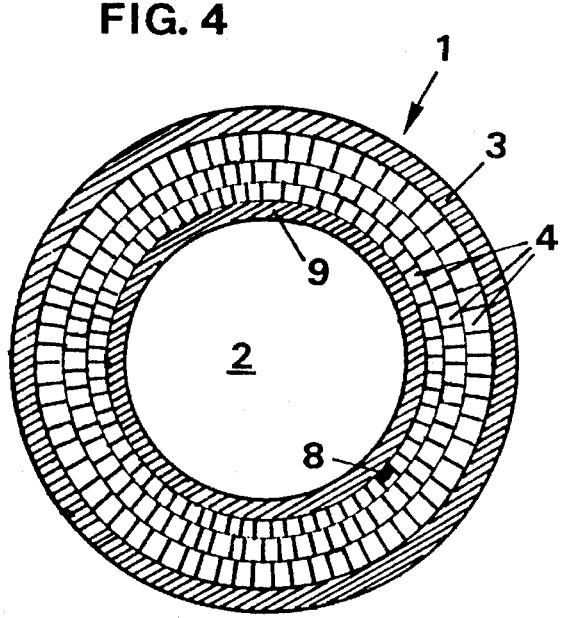
FIG. 4 and FIG. 5 are schematic cross-sections of a fourth and fifth embodiment of a hollow fiber-reinforced plastic body.

To construct the double-walled shell, the winding 4 is produced with one or more tapes or strips of uncut double pile cloth, preferably with tape edges open at the side. A layer with the tape or tapes of double pile cloth is preferably wound with the tape edges side by side, the distance between adjacent tape edges being made small; preferably, the tape edges which are adjacent in the winding butt against one another. The tapes can have been brought to a desired width, preferably less than 90 cm, by cutting or directly, for example, by weaving. According to FIG. 1, the winding 4 consists of such a layer of double pile cloth. According to FIG. 4 the winding 4 may consist of a plurality of superposed layers, in which case the tape or tapes of the following wound layer cover the butted edges of the previous wound layer. The winding 4 is finally covered by the winding 3 produced from optionally pre-resinated finishing material, for example a flat woven fabric or nonwoven fabric. The side edges of the winding 4 can be closed by the cover winding 3.

The resin used for impregnating the windings 3, 4 is a curable reactive resin, for example unsaturated polyester, epoxies, vinyl esters, phenols, PUR, silicones (SI), polyimides (PI) or polyamide-imides (PAI). It is also possible to use UV-curing resins. The resin defines a polymer matrix having the windings 3 and 4 embedded as reinforcing component to form a composite material.

To produce the hollow fiber-reinforced plastic body of FIG. 1, a rotating drum or core is wound with one or more tapes of uncut double pile cloth, producing the winding 4, and then with a finishing layer, for example resin-impregnated rovings, nonwovens, mats, woven fabrics, etc. to produce the winding 3. The resin impregnation carried out in this way also leads to an impregnation of dry-wound tapes of the double cloth. However, depending on the method of winding, it is also possible for the tape or tapes of double pile cloth to be wound in the resin-impregnated state.

Furthermore, after winding, the tapes of double pile cloth may be sprayed with a reactive resin and, after curing, be sheathed with a finishing layer which hides the butted edges of adjacent tapes, for example with a resin-impregnated nonwoven, mat, fabric, etc.

In the case of hollow plastic bodies, preferably tanks having a so-called flat bottom and top, the cylindrical part can comprise a winding 4 to which has been attached a sheetlike bottom and/or top part, composed of a double pile cloth, wherein the curved angle-sections are covered by an outer finishing layer and hence forms a cavity connection between the cylindrical section and the bottom and/or top section. The finishing layer is preferably formed of a hardenable flat woven fabric or nonwoven fabric.

To construct the double-walled shell in the case of spherical hollow plastic bodies 1 the double pile cloth can consist of individual joined segments.

Figure 2:
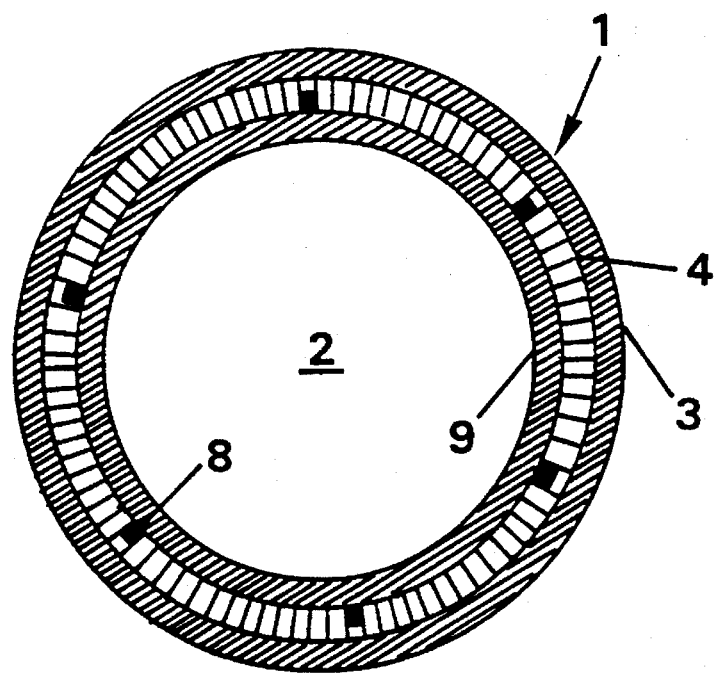
FIG. 2 is a schematic cross-section of a second embodiment of a hollow fiber-reinforced plastic body.

FIG. 2 shows a second illustrative embodiment of a hollow fiber-reinforced plastic body 1 wherein the winding 4 of uncut double pile cloth has been arranged as a core layer between an outer winding 3 of high-strength fibers and an inner winding 9 of high-strength fibers, this wound composite having been densified with a curable resin impregnation of the type mentioned. Otherwise the above observations concerning FIG. 1 and FIG. 4 apply.

Figure 3:
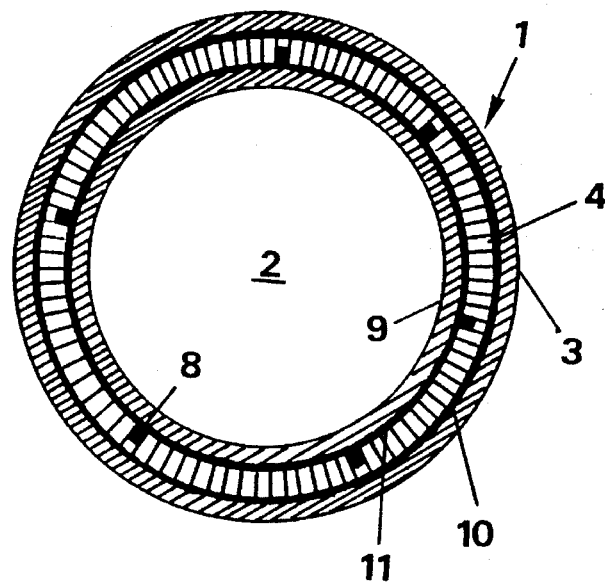
FIG. 3 is a schematic cross-section of a third embodiment of a hollow fiber-reinforced plastic body.

FIG. 3 shows a third illustrative embodiment of a hollow fiber-reinforced plastic body which differs from the second embodiment shown in FIG. 2 in that additional glass fiber mats 10, 11 have been placed between the windings 3, 9 of the high-strength fibers and the winding 4 of uncut double pile cloth and co-densified. Otherwise, the above observations concerning FIG. 1 and FIG. 4 apply once more.

In a further illustrative embodiment, the double pile cloth can also consist of a knitted top and bottom cloth 5.

Figure 5:
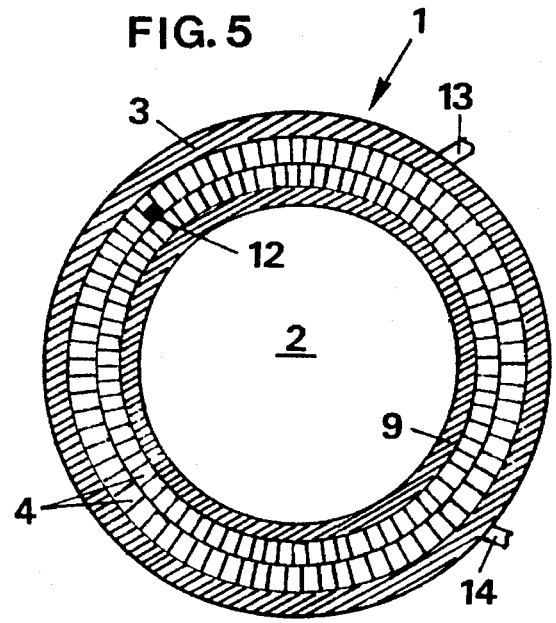

FIG. 5 shows a fifth embodiment of a hollow fiber-reinforced plastic body 1 which differs from the one shown in FIG. 2 in that the winding 4 is used as a passage for the flow of a solid, fluid or gaseous medium to control the temperature of the interior 2 of the hollow plastic body 1. The edges of the winding 4 are closed for this purpose. Then, the leakage detectors are replaced by temperature and/or charging control devices. Outboard inlet 13 and outlet 14 devices are provided for introduction and removal of the temperature control medium.

Although the invention has been described in connection with what is presently considered to be the most practical and preferred embodiments, it is to be understood that the invention is not limited to the disclosed embodiments, but rather, is intended to cover various modifications and equivalent arrangements included within the spirit and scope of the appended claims.

What is claimed is:

1. A hollow fiber-reinforced body tank consisting of:
   a double-walled structure consisting of a layer of a double-ply cloth tape having spaced apart top and bottom plies, defining a continuous cavity, together with binding pile threads extending therebetween in a hollow space;
   said tape forming said body as a winding having side edges in an edge-to-edge manner with laterally open adjacent edges;

said tape being impregnated with a curable resin without filling said cavity; and an inner and outer finishing layer overlaying and adhered to inner and outer surfaces, respectively, of said double-walled structure that surrounds and seals the hollowing interior thereof.

2. The hollow fiber-reinforced body according to claim 1, wherein a portion of said weft fibers is comprised of a thermoplastic material.

3. The hollow fiber-reinforced body according to claim 1, wherein the length of said pile threads is between 3 mm and 8 mm.

4. The hollow fiber-reinforced body according to claim 1, wherein the density of said pile threads is between 20 and 80 pile threads/cm$^2$.

5. The hollow fiber-reinforced body according to claim 1, wherein the width of said double-ply cloth tape is less than 90 centimeters.

6. A hollow fiber-reinforced body according to claim 1 wherein said curable resin consists of a thermosetting resin.

7. A hollow fiber-reinforced body according to claim 6 wherein said thermosetting resin is selected from the group consisting of unsaturated polyester resins, epoxy resins, phenolic resins, silicon resins, urethane resins, polyamide resins, and polyamide-imide resins.

8. A hollow fiber-reinforced body according to claim 1 wherein said curable resin is a U-V setting resin.

9. A hollow fiber-reinforced body according to claim 1 wherein said double-ply cloth tape comprises first and second plies, each ply consisting of woven warp and weft fibers, said plies being interconnected by pile threads, said pile threads being oriented in the warp direction, said warp fibers, weft fibers, and pile threads consisting of glass fibers.

10. A hollow fiber-reinforced body according to claim 1 wherein leak detectors are provided within said cavity between said inner and outer walls of said double-walled shell.

11. A hollow fiber-reinforced body according to claim 1 wherein inlet and outlet means are provided to permit fluid flow into and out of said cavity between said inner and outer walls of said double-walled structure.

12. A hollow fiber-reinforced body according to claim 1 wherein said double-ply cloth tape is wound in a first and at least a second layer, each said layer being wound in a side-by-side manner to form a multi-walled shell, each double-ply cloth layer having an inner wall and an outer wall defining a cavity therebetween, said inner wall of first said layer further defining the hollow interior of said body.

13. The hollow fiber-reinforced body according to claim 1, wherein said double pile cloth tape has been produced by a warp velvet technique.

14. The hollow fiber reinforced plastic body according to claim 1, wherein said first layer of double pile cloth has been arranged as core layer between inner and outer layers of high-strength fibers.

15. The hollow fiber-reinforced body according to claim 1, wherein said layer of double pile cloth tape has been arranged in a layered assembly between inner and outer layers of high-strength fibers and adjoining glass fiber mats.

16. The hollow fiber-reinforced body according to claim 1, wherein said inner and outer finishing layers include glass fiber rovings.

17. The hollow fiber-reinforced body according to claim 1, wherein said double-ply cloth tape is applyable in a resin-impregnated state.

* * * * *